United States Patent [19]

Gagneraud et al.

[11] Patent Number: 4,461,636
[45] Date of Patent: Jul. 24, 1984

[54] INSTALLATION FOR CONTINUOUS TREATMENT OF MOLTEN MATERIALS TO OBTAIN PELLETIZED PRODUCTS

[76] Inventors: Francis Gagneraud, villa Montmorency, 6 Av. des Tilleuls, 75016 Paris; Michel Gagneraud, 16 Boulevard Raspail, 75007 Paris, both of France

[21] Appl. No.: 497,821

[22] Filed: May 25, 1983

[30] Foreign Application Priority Data

Mar. 17, 1983 [FR] France .................................. 83 04354

[51] Int. Cl.³ .............................................. C03B 19/10
[52] U.S. Cl. ....................................... 65/141; 241/39; 425/6
[58] Field of Search ....................... 65/19, 141; 241/39; 425/6

[56] References Cited

U.S. PATENT DOCUMENTS

| | | | |
|---|---|---|---|
| 2,212,962 | 8/1940 | Stuart et al. | 65/141 |
| 2,499,600 | 3/1950 | Meinzer | 65/141 |
| 3,278,284 | 10/1966 | van Dolah et al. | 65/141 X |
| 4,153,440 | 5/1979 | Legille et al. | 65/19 |
| 4,305,743 | 12/1981 | Hommel et al. | 65/19 X |
| 4,414,016 | 11/1983 | Orlander et al. | 65/141 |

*Primary Examiner*—Robert L. Lindsay, Jr.
*Attorney, Agent, or Firm*—Browdy and Neimark

[57] ABSTRACT

Installation of the type according to which molten mineral, subjected to spraying with water jets, is sent onto a rotary drum, then dispersed as a shower in a closed insulating enclosure provided at its base with a system for receiving the cooled particles or pellets, includes as such drum a fluid-tight drum which is cooled by internal circulation of water in a closed circuit and provided with blades having a special profile in the shape of a scoop or chistera. Further, the receiving system includes a series of vibrating tables placed in a cascade the last table of which, the farthest from the rotary drum and receiving the contents from the upstream tables, pours all the collected dry pellets onto a hooded belt conveyor which brings the pellets to storage hoppers or silos.

6 Claims, 3 Drawing Figures

INSTALLATION FOR CONTINUOUS TREATMENT OF MOLTEN MATERIALS TO OBTAIN PELLETIZED PRODUCTS

FIELD OF INVENTION

The invention relates to the treating and conditioning of molten mineral materials, such as metallurgical slags and other silicate materials, to obtain particles or aggregate cooled in expanded form for various uses. More particularly it relates to improvements made in pelletizing installations to obtain dry materials exhibiting a good homogeneity from the granulometric view point.

BACKGROUND

In the field of treating metallurgical slags and particularly blast furnace slags, the pelletizing technique makes it possible to obtain expanded particles with a diameter up to 15 or 20 mm by subjecting the molten material to a mechanical dispersion obtained with a rotary drum the blades of which fragment the stream of partially expanded and water jet cooled molten material and project the formed particles into the atmosphere where the cooling continues. After dropping of the granules onto a slanted receiving area for the unvaporized water to be evacuated, the pelletized material is picked up by mobile devices and sent to a sorting installation.

Several improvements have already been made in this technique, of which there can be cited the use of devices to regulate the flow of molten material (French Pat. No. 76.28855 of 9/24/76; also see equivalent G.B. No. 1,514,379) the combination of a tank provided with a cooled overflow lip and a cooled table bringing the molten material to the rotary drum assuring that it is shredded (U.S. Pat. No. 4,152,131); adapting of the number of arrangement of the blades on the drum to obtain granules of variable dimensions (French Pat. No. 80 08 368 of 1/15/1980).

Even with this successively improved pelletizing technique, the resulting pelletized products exhibit two drawbacks inherent in the process itself and in the design of the drum. Actually, for a given peripheral drum speed, because of the effect of air resistance, the smaller granules having a shredded form have shorter trajectories than the coarser granules with a high sphericity index; also, the pile formed on the receiving area exhibits a granulometric heterogeneity that is difficult to eliminate at the time of pick-up by the mobile devices and when the raw material is being stored, which causes disturbances during the sorting operation and leads to a considerable imperfection in screening.

Further, the rotary drums used so far for dispersion of the molten material comprise interior cooling with water that is ejected through orifices located at the base or end of the blades, under the action of centrifugal force. This system certainly assures an effective protection of the apparatus but exhibits the greater drawback of causing emission of water on the entire rotating jacket, while the ejection of the material is performed only on a fourth of the drum surface.

For this reason, three fourths of the water used for cooling the drum has no action on the damping of the pelletized material. This water does not vaporize and tends to accumulate near the drum, wet the base of the pile of pelletized material and ascend there by capillary action. The part of the pile closest to the drum then tends to become saturated with water, and hence there is a notable elevation in the degree of moisture of the whole pile after it is removed.

SUMMARY OF THE INVENTION

This invention aims at eliminating, or at least reducing in great part, all the drawbacks listed above, and for this purpose proposes solutions making it possible continuously to produce pelletized materials that are practically dry and exhibit an excellent granulometric homogeneity, i.e. uniformity of particle distribution, for example, selected within the range of up to 20 mm for slag aggregates.

The improved installation for pelletizing molten mineral materials, particularly slags, according to the invention, uses the already known principles of shredding molten material with a rotary drum and insulating the treating medium in a closed enclosure with a system, at the base, for receiving the cooled or pelletized mineral particles; but it is essentially characterized in a novel way in that a fluid-tight drum is used which is cooled by internal circulation of water and provided with blades having a special scoop shape profile, and in that the particle receiving system consists of a series of vibrating tables placed in cascade of which the last, farthest from the rotary drum and receiving the content from the upstream tables, pours all the collected dry pellets on a hooded belt conveyor which brings the pellets to storage hoppers or silos.

According to a first characteristic of the invention, the design and construction of the rotary drum, which constitutes the main element of pelletizing installation, has been notably modified. First of all, to avoid emission of undesirable water coming from internal cooling of the drum and escaping through the orifices of the blades, a system has been designed to cool the blades and jacket on the inside without outside ejection of water, the water entering and leaving along the axis of the drum with circulation within the drum interior.

Because of this improvement, there is no longer any accumulation of water under the rotary drum, which makes it possible to avoid wetting the part of the pile closest to the drum and which is essentially made up of particles less than 4 mm.

To make up for the effective fraction of water that would then be lacking, it is possible either to increase the rate of delivery of the water jets thereby assuring the cooling of the upper face of the feed table, located between the molten material spout and the rotary drum, or to add an additional water jet nozzle located under this same table to supply water spraying the outside surface of the jacket and blades of the rotary drum.

According to the invention, a second improvement has been made in the configuration of the rotary drum. Cutting of the slag leaving the end of the feed table is caused by the passage of the ends of the blades at a frequency depending on the angular speed of the drum and the number of blades carried by the drum. Projection into the atmosphere of the particles coming from the strip or film of slag during expansion is also a function assured by providing blades the shape of which have an extreme influence on the characteristics of the trajectory of the particles.

It has now been found as a result of experiments that blades having a spoon or chistera, i.e. scoop, profile or of a Pelton turbine blade configuration result in a better projection of the material by considerably reducing the angle of dispersion of the particles and by making their trajectory flatter, which makes it possible to reduce the height of the enclosure containing the installation. The drums of this new design can be built by mechanical welding or else comprise molded and cast jackets.

According to another important characteristic of the invention, in the enclosure there is a line of vibrating tables the number of which varies as a function of the longest trajectory traveled by the coarsest spherical granules. These tables are intended to receive particles collected all along the trajectory by slanted side panels of abrasion and corrosion resistant material; the collected material is poured from one table to the next to the end of the line and falls onto a conveyor belt of which resists temperatures that can go up to 200°–300° C.; this conveyor is completely hooded to avoid losses of material from the wind or rewetting in case of bad weather.

The tables are arranged so that their trays are in a slightly rising slope in the direction of the progress of the material that advances by jumping. This arrangement enables the cooling water, which is distributed by the various ramps and which at certain times of the pelletizing operation can be excessive and not be vaporized upon contact with the slag, to flow to the back of the tables and be collected in a trough from which it can be removed by pumping and recycled.

The pelletized material falling on the table closest to the drum consists, for the most part, of fines of shredded appearance the water content of which may not be zero. On the other hand, globules the dimensions of which can reach 15 to 20 mm and which, because they have a temperature above 100° C., are totally dry are collected on the tables farthest from the drum.

As a result of the arrangement of the vibrating tables, these pellets fall on a bed of fine particles the water of which has been eliminated during their progression. In this, a material with regular granulometry and the water content of which is less than 1% is obtained at the end of the last table of the line. The conveyor receives a mixture that is homogeneous from the viewpoints of granulometry and dryness to take it to storage hoppers or silos.

In this way, certain drawbacks are avoided such as picking up in bulk of insufficiently cooled materials, heterogeneities in the granulometry and water content found along the pile formed on the receiving area.

According to a variant for using the process, the last one or two tables can be provided with trays having perforations of given dimensions making possible a direct and continuous sorting of the material collected on the line of tables. In this case, the installation is provided with a number of conveyors equal to the number of different granulometric batches, perpendicular to the line of tables. These conveyors are completely hooded to avoid flying of the material under the action of the wind and rewetting in case of bad weather and bring the sorted materials to storage hoppers or silos.

The material thus obtained from blast furnace slag exhibits improved characteristics in comparison with those of materials fabricated in prior installations not equipped with the improvements mentioned above, in particular:
homogeneity of the granulometry;
homogeneity of the degree of moisture between 0 and 1%;
homogeneity of the degree of vitrification.

Because removal of the material is performed continuously with the vibrating tables and conveyors that are heat-resistant, there is no degradation of the particles by crushing caused by devices such as chargers which do not have to be used.

The material stored in the hoppers contains a slight proportion of broken pellets and, in case of sorting by screening, the grades greater than 3 or 4 mm contain a very large proportion of whole pellets having a high sphericity index and exhibit improved characteristics for later uses.

According to still another improvement in the installation improved according to the invention, it is possible to improve retention of fibrous particles formed during dispersion of certain molten silicate materials, such as blast furnace slags, when the chemical composition and thermal state are favorable to drawing of the fibers at the moment of projection of the material by the blades of the rotary drum. According to this improvement, the closed enclosure containing the pelletizing installation is provided on the sides in its upper part with a filtering system to retain the fibers entrained upward by the rising hot air current charged with dry steam.

Such filtering system is made up of two vertical filtering barriers about a meter apart allowing a man to pass. The outside barrier comprises a close mesh metal sheet (on the order of a millimeter) while the inside barrier consists of a looser flexible filtering screen (about 10 mm), that unfurls by its own weight. This filtering barrier unclogs itself, because the retained fibrous particles become detached from the inside filtering screen when the layer of fibrous material, deposited by the rising hot air current, becomes too thick, comes loose and falls on the tables to be mixed with the granular material there.

At the end of the pelletizing operation, because of the disappearance of the rising hot air current, complete unclogging is done either by itself or with a system making it possible to act on the filtering barrier. The fibrous material collected separately at the end of the operation can be used for various purposes for example insulating material.

BRIEF DESCRIPTION OF DRAWING

The main characteristic of the invention, which were mentioned above, are illustrated diagrammatically in the accompanying drawings which respectively represent.

DETAILED DESCRIPTION OF EMBODIMENTS

Figure 1:
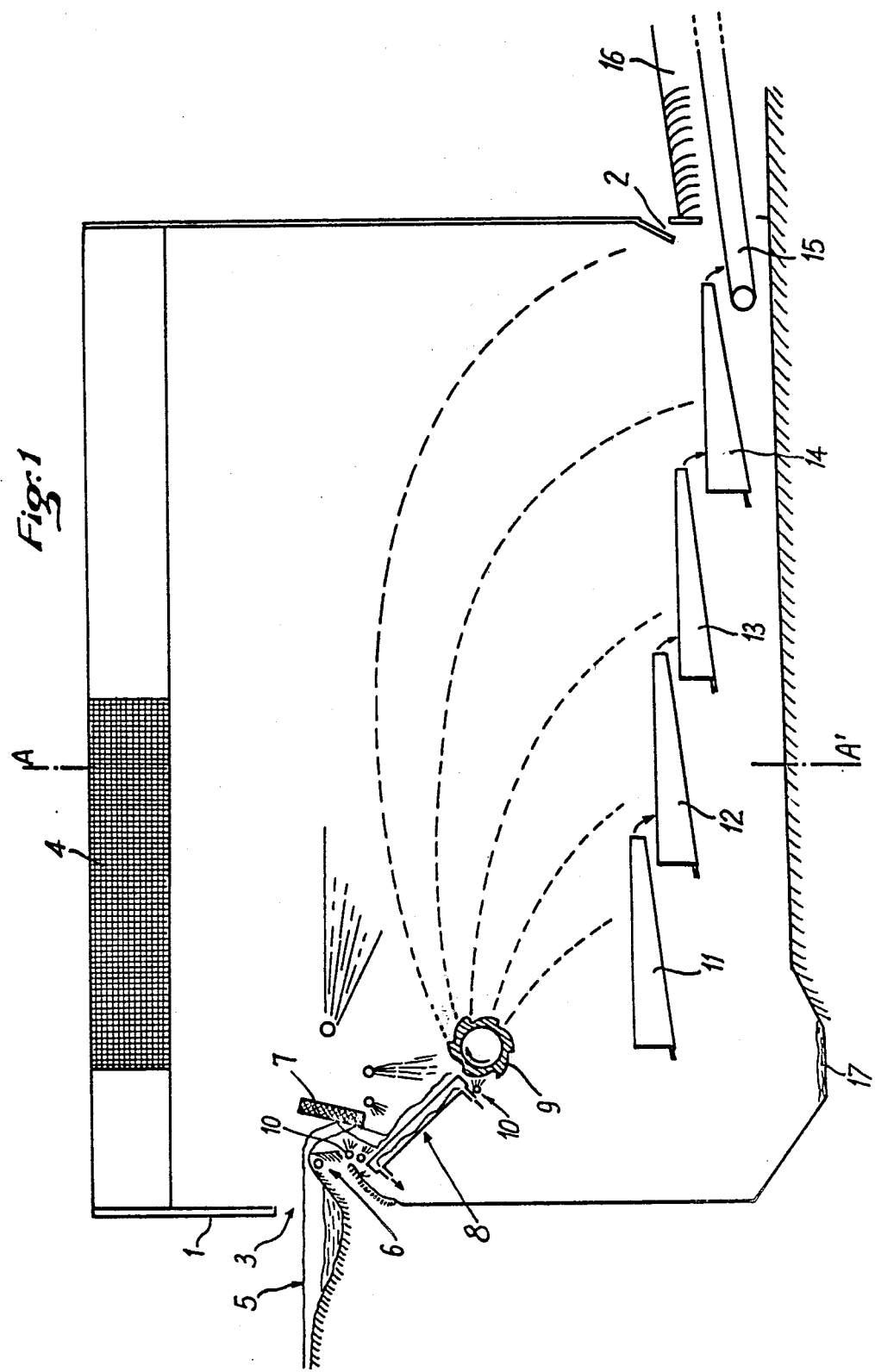
FIG. 1: a general view, in section, of a pelletizing installation according to the invention, for example, of metallurgical slag.

A pelletizing device as shown is placed in an enclosure 1 made of a heat and sound insulating material that is resistant to a hot, humid atmosphere. Several openings 2 and 3 are made in the walls of this enclosure to permit intake of outside air into the enclosure to assure a renewal of the atmosphere. Removal of hot, moist water is carried out at the upper part of the enclosure 1 provided with a vertical filtering system comprising two parallel barriers 4 to retain fibrous particles.

The pelletizing device itself comprises:

a holding tank 5 intended to slow the speed of the stream of slag coming from the blast furnace and assuring decanting of the entrained liquid iron;

an overflow lip 6 cooled by internal water circulation making it possible to evacuate the slag from the holding tank in a sheet of given width (French Pat. No. 76.28855 noted above):

a deflector 7, also cooled, to modify the trajectory of the sheet of slag being poured past the overflow lip;

a feed table 8, cooled by internal water circulation, intended to receive the slag deflected by the deflector 7 and re-direct it toward the rotary drum;

a rotary drum 9 comprising a closed cooling circuit avoiding the ejection of undesirable water and, with its blades 9' (see FIG. 3) in the shape of a spoon or Pelton turbine blade, cutting the expanded and partially cooled slag descending from the feed table 8;

a system 10 of a bank of injectors supplying water jets in varied shapes, amounts and speeds intended to cause the expansion of the molten slag, its sliding on the feed table, assure cooling of the outside surface of the drum and wetting of the slag particles during their trajectory in the air;

a series of vibrating tables 11 to 14 intended to receive the slag particles collected by upwardly and outwardly inclined side panels 18 (see FIG. 2) and to make such particles progress while assuring their homogenization;

a completely hooded conveyor 15 comprising a heat-resistant belt carrying the pelletized material to suitable storage hoppers or silos;

a trough 17 to collect and decant the water draining from the tables 11–14 when it is in excess as a result of the variations in the water/slag ratio. This water is picked up by pump and sent back into the circuit.

A variant, not shown, involves placing at the end of the line one or two tables with perforated trays making it possible to feed products sorted in the desired dimensions to conveyors in a number equivalent to that of the granulometric grades in order to direct them to quite distinct storage silos.

Figure 2:
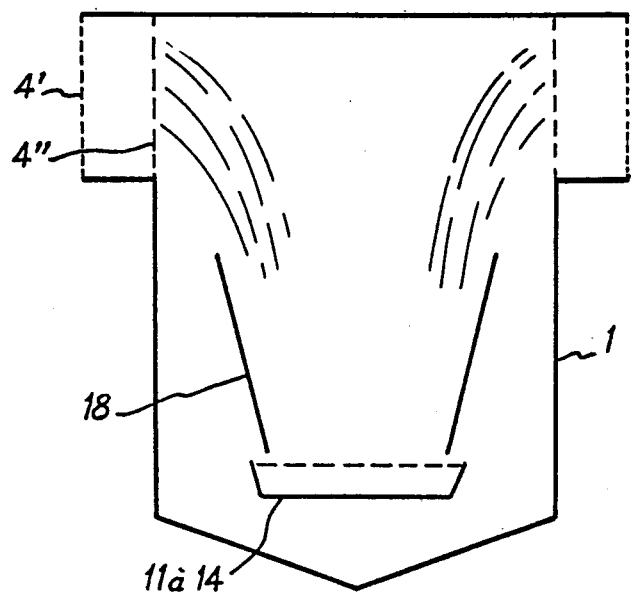
FIG. 2: a section along line A—A' of FIG. 1, on a reduced scale.

As can be seen diagrammatically in FIG. 2, filtering barriers 4 advantageously consist of an outside grate 4' whose mesh is on the order of 1 mm and a flexible latticed screen 4" whose mesh is about 10 mm, which unfurls under its own weight when it is hung in place.

Figure 3:
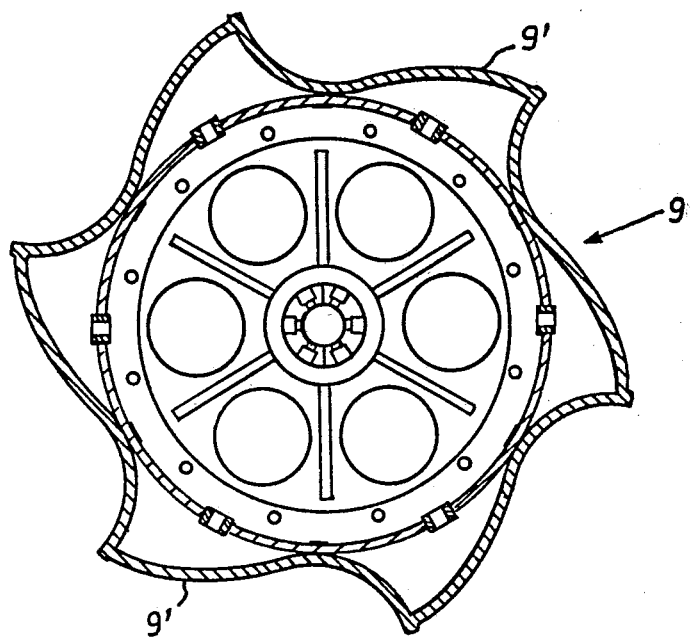
FIG. 3: an embodiment of the rotary drum with the special shaped blades.

FIG. 3 shows a cross-section of a suitable rotary drum 9 having a cylindrical inner shell and a contoured outer shell which forms the blades 9'. Cooling water is fed to the interior of the inner drum along the axis and flows to the periphery by gravity, from whence it flows through suitable openings in the inner drum so that it can reach the space between the inner drum and the blades 9'.

The materials obtained from blast furnace slag, according to the process of the invention, exhibit a good granulometric regularity, a homogeneous vitrification rate and a moisture content less than 1%. The materials are particularly suitable for preparing aggregate for mortars and light concretes and for making hydraulic binders.

It is to be understood that the invention is not limited to the embodiments disclosed which are illustratively offered and that modifications may be made without departing from the invention.

What is claimed is:

1. Apparatus for treating molten mineral materials, including metallurgical slags, for recovery of expanded particles, granules or pelletized products, comprising
   means for forming the molten material into a sheet and subjecting the molten sheet to spraying with water jets;
   a rotary drum having blades and means to rotate said rotary drum in the path of the stream of partially expanded and water jet cooled molten material to fragment said stream and project the formed particles into the atmosphere where cooling continues;
   means for receiving the partially cooled particles projected by said rotary drum;
   said rotary drum being fluid-tight and including internal cooling means for effecting cooling of said fluid-tight drum by internal circulation of water in a closed circuit;
   said rotary, fluid-tight drum having blades of a scoop or chistera shape; and
   said means for receiving the cooled particles comprising a series of vibratory tables arranged in a cascade, the last and farthest from said rotary drum of which receives the contents from the tables upstream thereof, and which last table delivers collected dry pellets onto a conveyor means.

2. An apparatus according to claim 1, wherein said conveyor means comprises at least one hooded belt conveyor which carries the collected dry pellets to at least one storage hopper or silo.

3. An apparatus according to claim 2, wherein the last one or two vibratory tables comprise perforated trays for direct sorting of the material travelling on said tables.

4. An apparatus according to claim 1, wherein at least the upstream one or more of said vibratory tables has its bottom surface inclined upwardly from its upstream end to its downstream end thereby providing means to drain water in a direction countercurrent to the direction of movement of said particles along said cascade.

5. An apparatus according to claim 2, further including a closed insulating enclosure having side walls, the upper portions of said side walls comprising two vertical filtering barriers for separating light fibrous material from hot gases, said two vertical filtering barriers including an outside filter having a mesh on the order of about 1 mm and an inside barrier having a flexible perforated screen on the order of about 10 mm, said screen being supported at its upper end and unfurling under its own weight when hung in place.

6. An apparatus according to claim 3, further including a closed insulating enclosure having side walls, the upper portions of said side walls comprising two vertical filtering barriers for separating light fibrous material from hot gases, said two vertical filtering barriers including an outside filter having a mesh on the order of about 1 mm and an inside barrier having a flexible perforated screen on the order of about 10 mm, said screen being supported at its upper end and unfurling under its own weight when hung in place.

* * * * *